July 28, 1959  G. W. LAURIE, SR., ET AL  2,896,566
TIRE PRESSURE INDICATOR
Filed Oct. 28, 1957
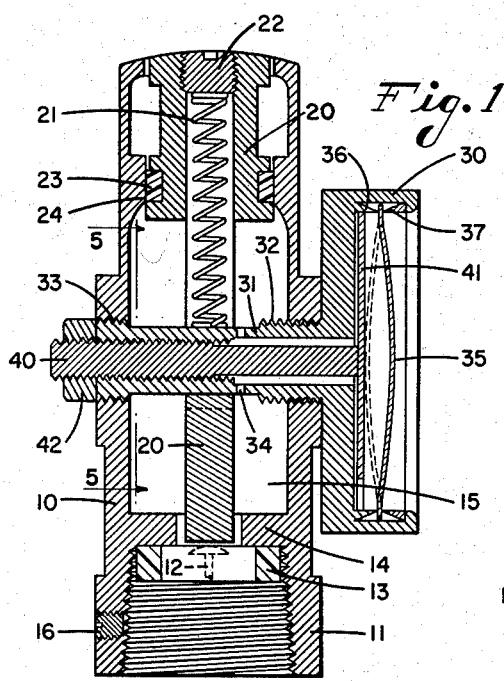
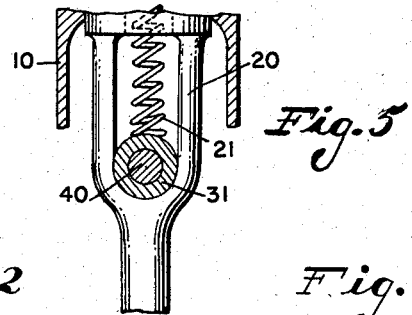
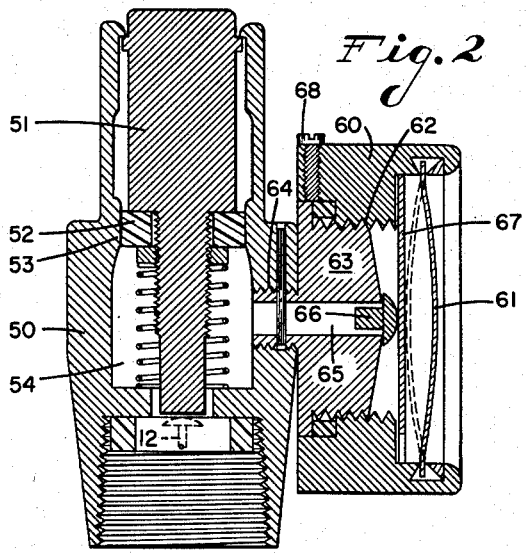
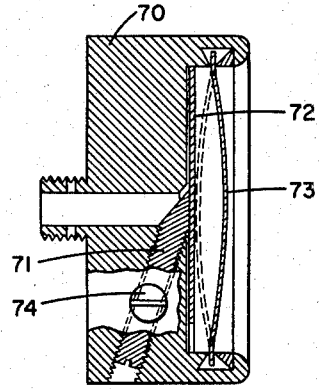
INVENTORS
GAVIN W. LAURIE, SR.
BY GAVIN W. LAURIE, JR.
Don J. Hatfield
ATTORNEY

United States Patent Office 2,896,566
Patented July 28, 1959

2,896,566

TIRE PRESSURE INDICATOR

Gavin W. Laurie, Sr., and Gavin W. Laurie, Jr.,
Springfield, Pa.

Application October 28, 1957, Serial No. 692,687

8 Claims. (Cl. 116—34)

The present invention relates to pressure indicating devices and more particularly to tire pressure indicators of the general type shown in Laurie Patent No. 2,651,279, issued September 8, 1953, and in copending patent application Serial No. 608,563, filed September 7, 1957, now Patent No. 2,866,432, issued December 30, 1958, of which the present invention is an improvement.

In the earlier patent and patent application referred to, a tire pressure indicator having a snap action diaphragm movable from an inwardly bowed position to an outwardly bowed position with an audible click in response to a minimum tire air pressure is disclosed.

It is a principal object of the present invention to provide a tire pressure indicator of the type described having improved means to adjustably predetermine the minimum pressure response of the indicator diaphragm.

Another object of the invention is to provide an improved tire pressure indicator of the snap action type which may be adjustably calibrated for uniform response.

Further objects, features and the attending advantages of the invention will be apparent with reference to the following specification and drawing in which:

Fig. 1 is a vertical section of one embodiment of the invention;

Fig. 2 is a vertical section of a modified embodiment of the invention;

Fig. 3 is a fragmentary vertical section to show the details of yet another embodiment of the invention;

Fig. 4 is a plan view of the backing disk as may be used in all embodiments of the invention; and Fig. 5 is a fragmentary cross-sectional view taken on line 5—5 of Fig. 1.

Referring to Figs. 1 and 5 of the drawings, a first but not necessarily preferred embodiment of the invention will be described. A body member 10 is provided with a threaded end 11 adapted to be detachably secured to the end of a tire valve stem, the valve plunger button 12 of which only is shown. A gasket 13 abutting the shoulder 14 provides the required atmospheric sealing between the hollow interior 15 of the body 10 and the tire valve stem. The body 10 may be semi-permanently attached to the tire valve stem and secured thereto against loss by means of the set screw 16.

A pressure release stem or plunger 20 is slidably journalled within the body 10 and is normally urged by the spring 21 to the upper position shown with its lower end out of contact with the tire valve stem button 12. This upper position may be adjusted by turning the threaded stop set screw 22. The gasket 23 engaging the shoulder 24 normally seals the interior 15 of the body from the atmosphere even when the plunger 20 is manually depressed a limited distance to engage the valve stem button 12 and release air from the tire into the interior space 15. However when filling the tire with air, the plunger 20 is further depressed by the pump chuck attachment to a position beyond the manual position described above to thereby disengage the gasket 23 with the shoulder 24 thus allowing air to flow from the pump into the interior 15 and through the valve stem into the tire.

An air and indicator chamber 30 is attached to the body 10 by the stem 31 which is threaded at 32 and 33 to bore holes extending transversely of the body 10. Obviously the chamber 30 may be attached to the body in any other desired manner provided that an air passage 34 communicating between the interior 15 and the interior of chamber 30 is provided. Extending across the free end of the chamber 30 is a snap action diaphragm 35 that is sealed thereto in air-tight relation by means of the knife edge 36 and gasket 37, the details of which may be similar to those which are described in copending patent application Serial No. 608,563, filed September 7, 1956, now Patent No. 2,866,432, issued December 30, 1958.

The spring snap action diaphragm 35 is formed to have characteristics which allow it to assume an inwardly bowed position or an outwardly bowed position and to change position with an audible click upon application of suitable force. I have found that the inward position of the diaphragm may be adjustably limited by an adjustable stop member, thus variably predetermining the amount of force required to change the diaphragm from the inwardly bowed position to the outwardly bowed position.

In the embodiment of the invention shown in Fig. 1 of the drawing, the adjustable stop member 40 is threadably journalled within the stem 31 of the chamber 30 and passes through the air passage 34 to a position behind the diaphragm 35.

In order to more effectively connect the stop member 40 and the diaphragm 35 in the inwardly depressed position as shown by the dotted lines of Fig. 1, and thereby provide more uniform response, a loosely fitted backing disk 41 (also see Fig. 4) may be interposed in the chamber 30 behind the snap action diaphragm 35.

Considering the operation of the invention as thus far described in connection with Figs. 1 and 4 of the drawing, it is assumed that the indicator body 10 is attached to the valve stem (not shown). The stop member 40 is adjusted to limit the inward position of the diaphragm 35 to a desired amount and is locked in such position by means of the lock nut 42. This position may be that which has been determined will allow for the diaphragm to snap outwardly when a certain minimum desired air pressure is supplied from the tire. Thereafter, whenever it is desired to check the tire for the desired minimum air pressure, it is only necessary to manually depress the diaphragm 35 to its inwardly bowed position as determined by the stop member 40 and then manually depress the pressure release stem or plunger 20 to admit air pressure from the tire into the interior 15 and the air passage 34 behind the backing disk 41 and diaphragm 35. If the air pressure is at least of the required minimum amount the diaphragm 35 will snap outwardly with an audible click.

A modified form of the invention is shown by Fig. 2 of the drawing. With this arrangement the body 50 is provided with the pressure release plunger 51 as shown having a gasket 52 engaging shoulders 53 to provide the sealed interior 54 into which air from the tire valve stem may be admitted.

The indicator chamber 60 with the snap action diaphragm 61 is threadably secured at 62 to a calibration adapter 63. The calibration adapter 63 is secured at 64 to the body 50 and an air passage 65 extends in communication with the body interior 54 and the air chamber 60. A centering pin 66 is loosely received in the chamber end of the bore 65 and is adapted to engage the backing disk 67 and diaphragm 61 in the inwardly depressed position. By rotating the chamber 60 to the calibration adapter 63 the inward position of the centering pin 66 corresponding to a stop member for the backing disk 67 and diaphragm 61 is changed to determine the minimum pressure response of the indicator as previously described. The adjusted position may be locked in place by the set screw 68.

Yet another embodiment of the invention is shown in detail by Fig. 3 of the drawing wherein the the indicator body which may be the same as shown in Fig. 2 of the drawing is not shown. In the arrangement of Fig. 3, the indicator chamber 70 is bored to receive a threaded stop member 71 that extends into the chamber behind the backing disk 72 and snap diaphragm 73. A locking screw 74 is provided to lock the adjusted position of the stop member 71 which in view of its threaded connection to the chamber 70 may be turned to be moved inwards or outwards of the chamber, thus changing the preset inward position of the snap diaphragm 73.

It should be obvious that various modifications may be made within the spirit of the invention and the scope of the appended claims.

What is claimed is:

1. In combination with a tire valve stem, a tire pressure indicator comprising a body detachably secured to said valve stem, an indicator chamber attached to said body, a snap diaphragm having characteristics to retain either an inwardly or outwardly bowed position depending upon forces applied to change its position with an audible click, said diaphragm being attached to said chamber and extending across said chamber in air-tight relation closing said chamber to the atmosphere, an air passage in said body in communication with the interior of said chamber behind said diaphragm, means in said body to admit air under pressure from said valve stem to said air passage and chamber, and means secured to said body and positioned rearwardly of said diaphragm adjustably limiting the inwardly bowed position of said diaphragm whereby the pressure of air in said chamber as required to provide a force to move said diaphragm from the inwardly bowed position to the outwardly bowed position with an audible click is variably predetermined.

2. In combination with a tire valve stem, a tire pressure indicator comprising a body detachably secured to said valve stem, an indicator chamber attached to said body, a snap diaphragm having characteristics to retain either an inwardly or outwardly bowed position depending upon forces applied to change its position with an audible click, said diaphragm being attached to said chamber and extending across said chamber in air-tight relation closing said chamber to the atmosphere, an air passage in said body in communication with the interior of said chamber behind said diaphragm, means in said body to admit air under pressure from said valve stem to said air passage and chamber, and a stop member extending into said chamber an adjustable distance behind said diaphragm adjustably limiting the inwardly bowed position of said diaphragm whereby the pressure of air in said chamber as required to provide a force to move said diaphragm from the inwardly bowed position to the outwardly bowed position with an audible click is variably predetermined.

3. In combination with a tire valve stem, a tire pressure indicator comprising a body detachably secured to said valve stem, an indicator chamber attached to said body, a snap diaphragm having characteristics to retain either an inwardly or outwardly bowed position depending upon forces applied to change its position with an audible click, said diaphragm being attached to said chamber and extending across said chamber in air-tight relation closing said chamber to the atmosphere, an air passage in said body in communication with the interior of said chamber behind said diaphragm, means in said body to admit air under pressure from said valve stem to said air passage and chamber, a backing disk loosely positioned in said chamber on the inward side of said diaphragm, and adjustable means engaging said disk in the inwardly bowed position of the diaphragm variably predetermining the inward position of the diaphragm whereby the pressure of air in said chamber as required to provide a force to move said diaphragm from the inwardly bowed position to the outwardly bowed position with an audible click is variably predetermined.

4. In combination with a tire valve stem, a tire pressure indicator comprising a body detachably secured to said valve stem, an indicator chamber attached to said body, a snap diaphragm having characteristics to retain either an inwardly or outwardly bowed position depending upon forces applied to change its position with an audible click, said diaphragm being attached to said chamber and extending across said chamber in air-tight relation closing said chamber to the atmosphere, an air passage in said body in communication with said chamber, means in said body to admit air under pressure from said valve stem to said air passage and chamber, a backing disk loosely positioned in said chamber on the inward side of said diaphragm, and adjustable means engaging said disk in the inwardly bowed position of the diaphragm variably predetermining the inward position of the diaphragm whereby the pressure of air in said chamber as required to provide a force to move said diaphragm from the inwardly bowed position to the outwardly bowed position with an audible click is variably predetermined.

5. In combination with a tire valve stem, a tire pressure indicator comprising a body detachably secured to said valve stem, an indicator chamber attached to said body, a snap diaphragm having characteristics to retain either an inwardly or outwardly bowed position depending upon forces applied to change its position with an audible click, said diaphragm being attached to said chamber and extending across said chamber in air-tight relation closing said chamber to the atmosphere, an air passage in said body in communication with the interior of said chamber behind said diaphragm, means in said body to admit air under pressure from said valve stem to said air passage and chamber, a stop member extending into said chamber an adjustable distance behind said diaphragm adjustably limiting the inwardly bowed position of said diaphragm whereby the pressure of air in said chamber as required to provide a force to move said diaphragm from the inwardly bowed position to the outwardly bowed position with an audible click is variably predetermined, and means to lock the adjusted position of said stop member.

6. In combination with a tire valve stem, a tire pressure indicator comprising a body detachably secured to said valve stem, an indicator chamber attached to said body, a snap diaphragm having characteristics to retain either an inwardly or outwardly bowed position depending upon forces applied to change its position with an audible click, said diaphragm being attached to said chamber and extending across said chamber in air-tight relation closing said chamber to the atmosphere, an air passage in said body in communication with the interior of said chamber behind said diaphragm, means in said body to admit air under pressure from said valve stem to said air passage and chamber, a backing disk loosely positioned in said chamber on the inward side of said diaphragm, a stop member extending into said chamber an adjustable distance behind said backing disk engaging said disk in the inwardly bowed position of the diaphragm variably predetermining the inward position of the diaphragm whereby the pressure of air in said chamber as required to provide a force to move said diaphragm from the inwardly bowed position to the outwardly bowed position with an audible click is variably predetermined, and means locking the adjusted position of said stop member.

7. In combination with a tire valve stem, a tire pressure indicator comprising a body detachably secured to said valve stem, an indicator chamber attached to said body, a snap diaphragm having characteristics to retain either an inwardly or outwardly bowed position depending upon forces applied to change its position with an audible click, said diaphragm being attached to said chamber and extending across said chamber in air-tight relation closing said chamber to the atmosphere, an air passage in said body to admit air under pressure from said valve stem to the interior of said chamber, and a stop member extending through said air passage into said chamber an adjustable distance behind said diaphragm adjustably limiting the inwardly bowed position of said diaphragm whereby the pressure of air in said chamber as required to provide a force to move said diaphragm from the inwardly bowed position to the outwardly bowed position with an audible click is variably predetermined.

8. In combination with a tire valve stem, a tire pressure indicator comprising a body detachably secured to said valve stem, an indicator chamber attached to said body, a snap diaphragm having characteristics to retain either an inwardly or outwardly bowed position depending upon forces applied to change its position with an audible click, said diaphragm being attached to said chamber and extending across said chamber in air-tight relation closing said chamber to the atmosphere, an air passage in said body in communication with the interior of said chamber, means in said body to admit air under pressure from said valve stem to said air passage and chamber, a backing disk loosely positioned in said chamber on the inward side of said diaphragm, and a stop member extending through said air passage into said chamber an adjustable distance behind said backing disk engaging said disk in the inwardly bowed position of the diaphragm variably predetermining the inward position of the diaphragm whereby the pressure of air in said chamber as required to provide a force to move said diaphragm from the inwardly bowed position to the outwardly bowed position with an audible click is variably predetermined.

References Cited in the file of this patent

UNITED STATES PATENTS 2,651,279   Laurie _____ Sept. 8, 1953